United States Patent [19]

Selin et al.

[11] Patent Number: 4,637,073
[45] Date of Patent: Jan. 13, 1987

[54] TRANSMIT/RECEIVE SWITCH

[75] Inventors: John R. Selin, Stow; Donald N. Jessen, Sudbury, both of Mass.

[73] Assignee: Raytheon Company, Lexington, Mass.

[21] Appl. No.: 624,490

[22] Filed: Jun. 25, 1984

[51] Int. Cl.[4] .................... H04B 1/44; H01P 1/10; H03G 9/00
[52] U.S. Cl. ........................... 455/78; 455/80; 333/103; 330/134
[58] Field of Search .............. 455/78, 80, 127, 79; 370/32; 307/241, 242, 568, 550; 333/101, 103, 333/124, 17 M; 330/127, 129, 130, 134, 144

[56] References Cited

U.S. PATENT DOCUMENTS

| | | | |
|---|---|---|---|
| 3,471,787 | 10/1969 | Morrison, Jr. | 455/80 |
| 3,887,872 | 6/1975 | Sharpe | 455/78 |
| 4,158,814 | 6/1979 | Imazeki et al. | 455/78 |
| 4,210,874 | 7/1980 | Moskowitz | 330/134 |
| 4,296,414 | 10/1981 | Beyer et al. | 333/103 |
| 4,481,641 | 11/1984 | Gable et al. | 455/78 |

FOREIGN PATENT DOCUMENTS

| | | |
|---|---|---|
| 613741 | 12/1948 | United Kingdom . |
| 690410 | 4/1953 | United Kingdom . |
| 1330026 | 9/1973 | United Kingdom . |
| 1490226 | 10/1977 | United Kingdom . |
| 1545641 | 5/1979 | United Kingdom . |
| 2097622A | 11/1982 | United Kingdom . |

*Primary Examiner*—Jin F. Ng
*Assistant Examiner*—Curtis Kuntz
*Attorney, Agent, or Firm*—Richard M. Sharkansky; Denis G. Maloney; Peter J. Devlin

[57] ABSTRACT

A transceiver transmit/receive (T/R) switching arrangement for electrically decoupling the transceiver's receiver circuit from first and second transceiver ports during transmission, and for electrically decoupling the transceiver's transmitter circuit from the first and second transceiver ports during reception. Each such circuit includes an amplifier for amplifying an applied microwave signal and operating with a relatively high output impedance when power is applied thereto. Each amplifier is inhibited from amplifying an applied microwave signal when power is removed therefrom. First bias means switchably applies power to the transmitter amplifier during transmission and removes power from the transmitter amplifier during reception to switch the relatively high output impedance of such amplifier to a relatively low output impedance. Second bias means switchably applies power to the receiver amplifier during reception and removes power from the receiver amplifier during transmission to switch the relatively high output impedance of such amplifier to a relatively low output impedance. Additional circuitry in the transmitter circuit couples the amplified microwave signal from the transmitter amplifier to the second transceiver port during transmission, and transforms the relatively low output impedance of the transmitter amplifier to a relatively high impedance at the second transceiver port during reception. Similar circuitry in the receiver circuit couples the amplified microwave signal from the receiver amplifier to the first transceiver port during reception, and transforms the relatively low output impedance of the receiver amplifier to a relatively high impedance at the first transceiver port during transmission.

24 Claims, 4 Drawing Figures

TRANSMIT/RECEIVE SWITCH

BACKGROUND OF THE INVENTION

This invention relates to the field of microwave circuits and more particularly to transmit/receive (T/R) switches for microwave circuits.

As is well known in the art, T/R switches for microwave circuits have a wide variety of applications. In one such application, an amplifier has an output coupled through a transmission line to an output port, the output port being additionally coupled to other circuits. When the amplifier is in use, a microwave signal amplified thereby is coupled to the output port by the transmission line. When the amplifier is not in use, it is desirable to electrically decouple the amplifier and transmission line associated therewith from the output port to prevent signals from the other circuits from coupling into the amplifier circuit. Such electrical decoupling is typically achieved through the use of a T/R switch. One known T/R switch comprises a depletion mode field-effect transistor (FET) having a grounded source electrode. The drain electrode is coupled to the junction of the amplifier's output and the transmission line. A control signal feeds the gate electrode to maintain the FET in a nonconducting condition when the amplifier is in use and to switch the FET to a fully conducting condition when the amplifier is not in use. The FET in the nonconducting condition maintains a high impedance between the drain and source electrodes and thus permits the amplified microwave signal to be coupled to the output port by the transmission line. Alternately, when the FET is switched to the fully conducting condition the impedance between the drain and source electrodes is switched to a low impedance, thus effectively placing ground potential at the output of the amplifier. The transmission line coupled between the output of the amplifier and the output port has an electrical length corresponding to a quarter-wavelength at the nominal frequency of the microwave signal and thus transforms the ground potential at the amplifier end of the transmission line to a high impedance at the output port, thereby electrically decoupling the amplifier and transmission line from the output port when the amplifier is not in use.

Such an arrangement finds application in microwave transmitter/receiver (transceiver) modules as are used in, for example, phased array antennas. A typical transceiver comprises a transmitter channel including a transmitter amplifier coupled between first and second ports by a pair of quarter-wavelength transmission lines, and a receiver channel including a receiver amplifier coupled between the first and second ports by a pair of quarter-wavelength transmission lines. For the transceiver to operate efficiently, it is desirable that the channels be electrically decoupled from one another. Thus, the T/R switching arrangement previously described is utilized in both channels to electrically decouple the receiver channel from the first and second ports during transmitter channel operation and alternately to electrically decouple the transmitter channel from the first and second ports during receiver channel operation. Typically, a transceiver T/R switching arrangement comprises two pairs of grounded source electrode FETs, a first pair associated with the transmitter amplifier and a second pair associated with the receiver amplifier. The transistors in each pair have drain electrodes connected to the input and output terminals, respectively, of the amplifier associated therewith. The gate electrodes of the first pair of FETs are fed by a transmit control signal and the gate electrodes of the second pair of FETs are fed by a receive control signal. During transmission, the transmit control signal biases the gate electrodes of the first pair of FETs to the FET pinch-off voltage and the receive control signal biases the gate electrodes of the second pair of FETs to zero volts. During reception, the converse is true; that is, the transmit control signal biases the gate electrodes of the first pair of FETs to zero volts and the receive control signal biases the gate electrodes of the second pair of FETs to the FET pinch-off voltage. In either phase of operation, the pair of FETs biased at the pinch-off voltage are maintained in an essentially nonconductive condition between their drain and source electrodes, thus presenting a high impedance to ground to the input and output terminals of the amplifier associated therewith and permitting proper operation of that channel. On the other hand, the pair of FETs biased at zero volts are fully conducting between their drain and source electrodes, thus placing essentially a short-circuit to ground at the input and output terminals of the amplifier associated therewith. Thus, the pair of transmission lines coupling that amplifier between the first and second ports are shorted to ground at the amplifier ends thereof. Since each transmission line has an electrical length corresponding to a quarter-wavelength at the nominal operating frequency of the transceiver, the short circuits to ground at the amplifier ends of such pair of transmission lines are transformed by such transmission lines to high impedances at the first and second ports, thereby electrically decoupling that channel from the first and second ports.

While the T/R switching arrangement just described performs satisfactorily in some applications, there are inherent disadvantages associated with it. For example, the drain electrode of the FET coupled to the output terminal of the transmitter amplifier is exposed to relatively high microwave voltages during transmission. As discussed, such FET is pinched-off during transmission and must remain pinched-off for all power levels of the transmitted microwave signal. Typically, the T/R switch FETs are n-channel devices. Thus, during positive instantaneous microwave voltage swings at the transmitter amplifier's output, the gate electrode need merely be more negative than the FET pinch-off voltage to keep the FET pinched-off because the FET's grounded source electrode is also the effective source terminal for the device. However, during negative instantaneous microwave voltage swings at the transmitter amplifier's output, the FET's drain electrode becomes more negative than the grounded source electrode and thus becomes the effective source terminal for the device. Accordingly, for the FET to remain pinched-off, the transmit control signal must maintain the gate electrode voltage more negative than the negative instantaneous microwave voltage swings of the transmitted microwave signal by at least the pinch-off voltage. Hence, a large instantaneous gate-to-drain voltage exists during positive instantaneous microwave voltage swings. The FET must have a gate-to-drain breakdown voltage greater than this instantaneous voltage to survive the operation. Since typical FET gate-to-drain breakdown voltages are limited, the microwave transmission power capability of transceivers using this type of T/R switching is correspondingly limited. Additionally, the pinched-off pair of switching FETs slightly conduct current between their drain and source electrodes, thus loading somewhat the channel associated therewith. This causes insertion loss in that channel, with concomitant loss in microwave signal power.

SUMMARY OF THE INVENTION

In accordance with the present invention, means are provided for amplifying an applied signal and operating with a relatively high output impedance when power is applied thereto, such means being inhibited from amplifying the applied signal when power is removed therefrom. Additional means respond to a control signal to switchably apply power to the amplifying means during a first operating mode and remove power from the amplifying means during a second operating mode to switch the relatively high output impedance of such amplifying means to a relatively low output impedance. Means are further provided for coupling the amplified signal to the output port during the first operating mode, and for transforming the relatively low output impedance to a relatively high impedance at the output port during the second operating mode.

The amplifying means comprises an output transistor, which may be a field-effect transistor (FET), having an input (gate) electrode fed by the applied signal, an output (drain) electrode, and a common (source) electrode coupled to a reference potential, the impedance between the output electrode and the common electrode being the output impedance of the amplifying means. The output electrode is coupled through the coupling and transforming means, which comprises a network and transmission line, to the output port. The output electrode is coupled to the switchable power applying and removing means through the network. The network and transmission line provide a predetermined phase shift between the output transistor's output electrode and the output port, the predetermined phase shift being substantially an odd multiple of a quarter-wavelength of the applied signal.

Thus, the present invention provides a transmit/receive (T/R) switching arrangement which permits coupling of the amplified signal to the output port in the first operating mode and electrically decouples the amplifier circuit (amplifying means, network and transmission line) from the output port in the second operating mode. Since the T/R switching arrangement utilizes the amplifying means as both an amplifying and switching device, additional switching devices, such as FETs which must be maintained in pinch-off during the first operating mode, are eliminated from the output of the amplifying means. Thus, the power of the amplified signal produced by the amplifying means may be increased. Additionally, the insertion loss of the circuit is reduced.

In a preferred embodiment of the invention, a transceiver is provided for switchably coupling, in accordance with control signals, a signal from a first port to a second port through a first circuit during a first operating mode, or a signal from the second port to the first port through a second circuit during a second operating mode. The second circuit is substantially electrically decoupled from the first and second ports during the first operating mode, and the first circuit is substantially electrically decoupled from the first and second ports during the second operating mode. The T/R switching arrangement of the present invention is disposed in each of the circuits. Thus, first and second amplifying means are correspondingly disposed in the first and second circuits for amplifying signals applied thereto and operating with a relatively high output impedance when power is applied thereto, such first and second amplifying means being inhibited from amplifying signals applied thereto when power is removed therefrom. Means responsive to a first control signal switchably applies power during the first operating mode to the first amplifying means, and removes such power from the first amplifying means during the second operating mode to switch the relatively high output impedance of the first amplifying means to a relatively low output impedance. Likewise, means responsive to a second control signal switchably applies power during the second operating mode to the second amplifying means, and removes such power from the second amplifying means during the first operating mode to switch the relatively high output impedance of the second amplifying means to a relatively low output impedance. The first circuit includes means for coupling the amplified signal from the first amplifying means to the second port during the first operating mode, and for transforming, during the second operating mode, the relatively low output impedance of the first amplifying means to an impedance at the second port substantially higher than the characteristic impedance of the second circuit. Similarly, the second circuit includes means for coupling the amplified signal from the second amplifying means to the first output port during the second operating mode, and for transforming, during the first operating mode, the relatively low output impedance of the second amplifying means to an impedance at the first port substantially higher than the characteristic impedance of the first circuit.

In a further embodiment of the invention, a microwave transceiver is provided having a transmitter circuit coupled between a first port and a second port and a receiver circuit coupled between the first and second ports. A microwave signal is coupled from the first port to the second port through the transmitter circuit during a transmission mode. During a reception mode, a microwave signal is coupled through the receiver circuit from the second port to the first port. The transmitter circuit comprises a transmitter amplifier having an input coupled to the first port by a first transmission line and an output coupled to the second port by a second transmission line. The receiver circuit comprises a receiver amplifier having an input coupled to the second port by a third transmission line and an output coupled to the first port by a fourth transmission line. Means are further provided, responsive to control signals, for coupling power to the transmitter amplifier and decoupling power from the receiver amplifier during the transmission mode, and for decoupling power from the transmitter amplifier and coupling power to the receiver amplifier during the reception mode. The one of the amplifiers having power coupled thereto amplifies a microwave signal applied to the input thereof, produces the amplified microwave signal at the output thereof, and operates with a relatively high output impedance. Conversely, the one of the amplifiers having power decoupled therefrom is inhibited from amplifying a microwave signal applied to the input thereof and operates with a relatively low output impedance. Also included are means, including the second transmission line, for coupling the amplified microwave signal from the output of the transmitter amplifier to the second port during the transmission mode, and for transforming, during the reception mode, the relatively low output impedance of the transmitter amplifier to an impedance at the second port substantially higher than the characteristic impedance of the third transmission line. Thus, during the reception mode, the transmitter circuit is substantially electrically decoupled from the second port by the T/R switching arrangement of the present invention. Additionally, means, including the fourth transmission line, are provided for coupling the amplified microwave signal from the output of the receiver amplifier to the first port during the reception mode, and for transforming, during the transmission mode, the relatively low output impedance of the receiver amplifier to an impedance at the first port substantially higher than the characteristic impedance of the first transmission line. Thus, during the transmission mode the receiver circuit is substantially electrically decoupled from the first port by the T/R switching arrangement of the present invention.

BRIEF DESCRIPTION OF THE DRAWINGS

These and other objects and advantages of the invention will be better understood from the following detailed description taken in conjunction with the drawings in which.

DESCRIPTION OF THE PREFERRED EMBODIMENT

Figure 1:
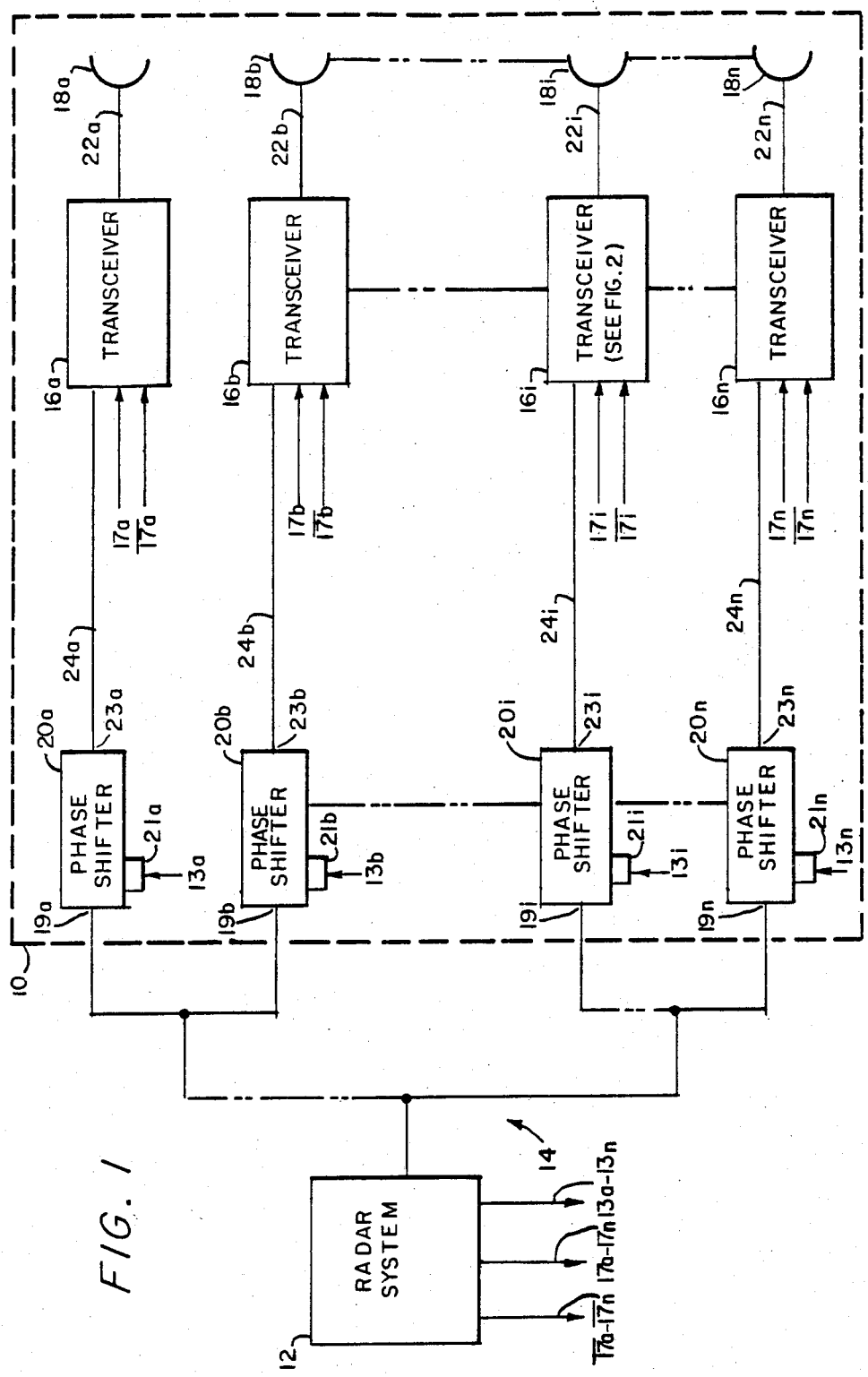
FIG. 1 is a block diagram of a radar system and phased array antenna in which the present invention is utilized.

Referring now to FIG. 1, a phased array antenna 10 is shown coupled to radar system 12 by feed network 14. Phased array antenna 10 includes a plurality, here n, of transceivers 16a–16n, each having an output coupled to a corresponding one of a plurality of antenna elements 18a–18n by microwave transmission lines 22a–22n, having a characteristic impedance of, here, 50 ohms. The inputs of transceivers 16a–16n are coupled via corresponding transmission lines 24a–24n to ports 23a–23n of corresponding recipocal phase shifters 20a–20n. The characteristic impedance of transmission lines 24a–24n is here 50 ohms. Feed network 14, comprising a network of microwave transmission lines having a predetermined characteristic impedance (here 50 ohms), couples radar system 12 to ports 19a–19n of corresponding reciprocal phase shifters 20a–20n. Radar system 12 also supplies, on lines 13a–13n, control signals to corresponding phase shifters 20a–20n to control the degree of phase shift introduced by each phase shifter. Complementary signals on lines 17a–17n and lines $\overline{17a}$–$\overline{17n}$ are used to control transceivers 16a–16n in a manner to be described. Briefly, phased array antenna 10 delivers a portion of a microwave radar signal generated by radar system 12 and amplified by transceivers 16a–16n to each antenna element 18a–18n in a predetermined phase relationship, as determined by the corresponding phase shifts of reciprocal phase shifters 20a–20n, to provide collimated and directed beams of energy for transmission to a target, not shown. Microwave reflections from the target are received by antenna elements 18a–18n, amplified by transceivers 16a–16n, shifted in phase by phase shifters 20a–20n, and coupled as a composite microwave signal by feed network 14 to radar system 12 for processing.

Figure 2:
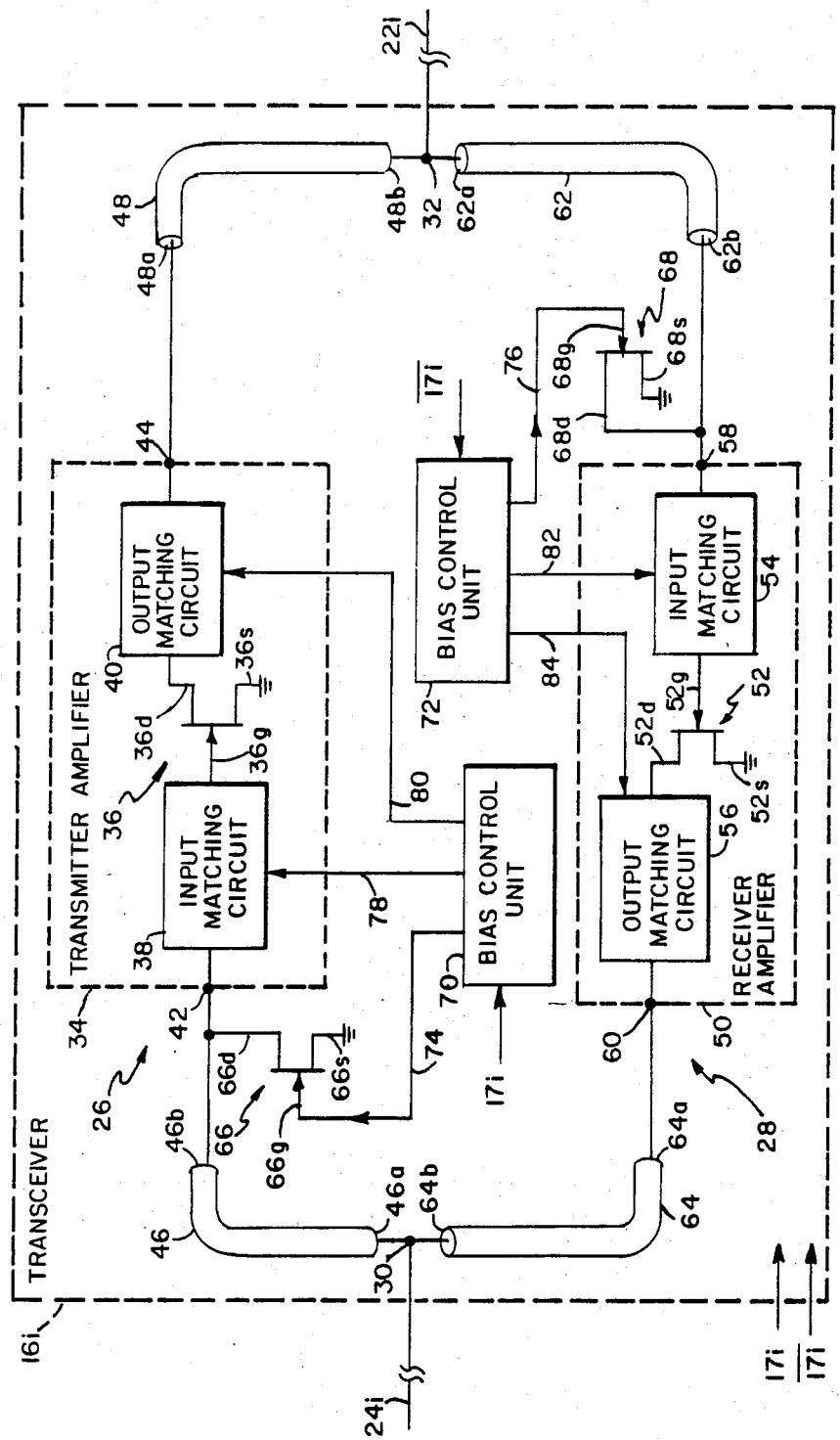
FIG. 2 is a combination block and schematic diagram of one of the transceivers used in the system of FIG. 1 incorporating the transmit/receive (T/R) switching scheme of the present invention.

Referring now to FIG. 2, a representative one, 16i, of the plurality of transceivers 16a–16n is illustrated in block diagram form. Transceiver 16i comprises transmitter channel 26 and receiver channel 28 coupled in parallel between a pair of input/output ports (phase shifter port 30 and antenna port 32). Transmission line 24i, here having a 50 ohm characteristic impedance, connects reciprocal phase shifter 20i to phase shifter port 30 (FIG. 1). Antenna port 32 is coupled to antenna element 18i (FIG. 1) by transmission line 22i, also having a characteristic impedance of 50 ohms. Transmitter channel 26 includes transmitter amplifier 34 comprising power amplifier 36, here a single-stage field effect transistor (FET) having a gate electrode 36g, a drain electrode 36d and a source electrode 36s. Depending on the amplification and output power required, transmitter amplifier 34 may comprise multiple amplifier stages rather than a single stage amplifier. In such case, FET 36 represents the final stage of the multi-stage amplifier. As shown, source electrode 36s is grounded at zero volts DC. Transmitter amplifier 34 also includes input matching circuit 38, coupled between transmitter amplifier input port 42 and gate electrode 36g, and output matching circuit 40, coupled between drain electrode 36d and transmitter amplifier output port 44. The operation of input and output matching circuits 38, 40 in transmitter amplifier 34 will be described in detail hereinafter. Suffice it to say here that input matching circuit 38 presents to gate electrode 36g an impedance approximately matched to the impedance of gate electrode 36g. The impedance presented by output matching circuit 40 to drain electrode 36d is selected to provide a load for FET 36 to enable the device to operate at high efficiency and provide maximum output power. Matching circuits 38, 40 also transform such matched impedances to the characteristic impedance of transmission lines 46, 48, respectively, coupled to transmitter amplifier 34. The characteristic impedance of transmission line 46 is here about 50 ohms. Transmission line 46 is connected at first end 46a to phase shifter port 30. Second end 46b is connected to transmitter amplifier input port 42. Transmitter amplifier output port 44 is connected to first end 48a of transmission line 48, the second end 48b of which is connected to antenna port 32. The characteristic impedance of transmission line 48 is here approximately 50 ohms.

Receiver channel 28 comprises receiver amplifier 50 which includes low-noise amplifier 52, shown as a single-stage FET having a gate electrode 52g, a drain electrode 52d, and a source electrode 52s. It is understood that multiple amplifier stages may be used if required. In such case, FET 52 is the final stage of such multi-stage amplifier. Receiver amplifier 50 further includes input matching circuit 54 coupled between receiver amplifier input port 58 and gate electrode 52g. Source electrode 52s is grounded (at zero volts DC), as shown. Output matching circuit 56 is coupled between drain electrode 52d and receiver amplifier output port 60. Receiver amplifier input and output matching circuits 54, 56 function similarly to transmitter amplifier input and output matching circuits 38, 40. Input matching circuit 54 presents an impedance to gate electrode 52g selected to optimize the performance of amplifier 50 in the presence of noise (i.e., the noise figure of amplifier 50) and is thus not necessarily matched to the impedance of gate electrode 52g. Output matching circuit 56 presents an impedance to drain electrode 52d selected to provide a load for FET 52 to enable the device to operate at high efficiency and provide maximum gain. Matching circuits 54, 56 also transform such matched impedances to the characteristic impedance of transmission lines 62, 64, respectively, coupled to receiver amplifier 50. Transmission line 62 here has a characteristic impedance of about 50 ohms, and is connected at first end 62a to antenna port 32 and at a second end 62b to receiver amplifier input port 58. Receiver amplifier output port 60 is connected to first end 64a of transmission line 64, the second end 64b of which is connected to phase shifter port 30. The characteristic impedance of transmission line 64 is here approximately 50 ohms.

Transceiver 16i also includes a pair of conventional switching FETs 66, 68 associated with transmitter amplifier 34 and receiver amplifier 50, respectively. The detailed function of switching FETs 66, 68 will be explained hereinafter. Suffice it here to say that switching FETs 66, 68 are associated with the transmit/receive (T/R) switching arrangement of the present invention, wherein a selected one of the transmitter or receiver channels 26, 28 is electrically decoupled from phase shifter port 30 and antenna port 32 during the operation of the other of the transmitter or receiver channels 26, 28. To this end, switching FETs 66, 68 are each connected in shunt to ground at input ports 42, 58 of transmitter and receiver amplifiers 34, 50, respectively. Thus, drain electrode 66d of switching FET 66 is connected to second end 46b of transmission line 46 at transmitter amplifier input port 42, source electrode 66s is connected to ground (zero volts DC), and gate electrode 66g is coupled to bias control unit 70 by line 74. Similarly, drain electrode 68d of switching FET 68 is connected to second end 62b of transmission line 62 at receiver amplifier input port 58, source electrode 68s is grounded (at zero volts DC), and gate electrode 68g is coupled by line 76 to bias control unit 72. The function of bias control units 70, 72 will be described in detail hereinafter. Briefly, however, bias control unit 70 responds to a transmit control signal on line 17i to supply switchable DC bias power on lines 78, 80 to power FET 36 via input matching circuit 38 and output matching circuit 40, respectively. Bias control unit 70 further responds to the transmit control signal on line 17i to provide a control signal on line 74 to selectively switch FET 66 between the "on" (conducting) and "off" (nonconducting) states. Likewise, bias control unit 72 provides, on lines 82, 84, switchable bias power in response to a receive control signal on line $\overline{17i}$ for low-noise FET 52 via input matching circuit 54 and output matching circuit 56, respectively. Bias control unit 72 further generates a control signal on line 76 for selectively switching FET 68, in response to the receive control signal on line $\overline{17i}$, between the "on" and "off" states.

During the transmit mode, radar system 12 (FIG. 1) generates a microwave signal having a predetermined nominal frequency $f_c$ (and wavelength $\lambda_c$) to be transmitted. A portion of the microwave signal is coupled to port 19i of reciprocal phase shifter 20i by feed network 14. Reciprocal phase shifter 20i alters the phase of the microwave signal applied thereto by a predetermined amount, controlled by a phase control signal generated by radar system 12 and fed on line 13i to control input 21i of phase shifter 20i. Transmitter channel 26 in transceiver 16i couples the phase-shifted output of reciprocal phase shifter 20i available at port 23i to antenna element 18i in response to complementary control signals on lines 17i, $\overline{17i}$. The microwave signal to be transmitted is coupled through transmission line 46 to transmitter amplifier 34. The amplified microwave output of transmitter amplifier 34 is coupled by transmission line 48 to antenna port 32, and further coupled on transmission line 22i to antenna element 18i and transmitted to a target.

In the receive mode, microwave signals reflected by the target and having a frequency substantially equal to nominal frequency $f_c$ doppler shifted due to target velocity are received by antenna element 18i. Such received signals are coupled by receiver channel 28 in transceiver 16i to reciprocal phase shifter 20i in response to the complementary control signals on lines 17i, $\overline{17i}$. The received microwave signal is coupled to receiver amplifier 50 through transmission line 62. Transmission line 64 couples the amplified microwave output of receiver amplifier 50 to phase shifter port 30, such microwave signal being coupled to phase shifter 20i by transmission line 24i. Phase shifter 20i shifts the phase of the applied microwave signal in accordance with a phase control signal on line 13i from radar system 12. The phase-shifted microwave signal from phase shifter 20i is fed to radar system 12 by feed network 14. Thus, referring once again to FIG. 1, each one of the plurality of transceiver modules 16a–16n are used in a similar manner to couple a portion of a microwave signal between radar system 12, via feed network 14, and the plurality of antenna elements 18a–18n to produce parallel and directed microwave beams from a single microwave source during the transmit mode, and to receive target reflections of such beams during the receive mode and apply a single, composite microwave signal to radar system 12.

Figure 3:
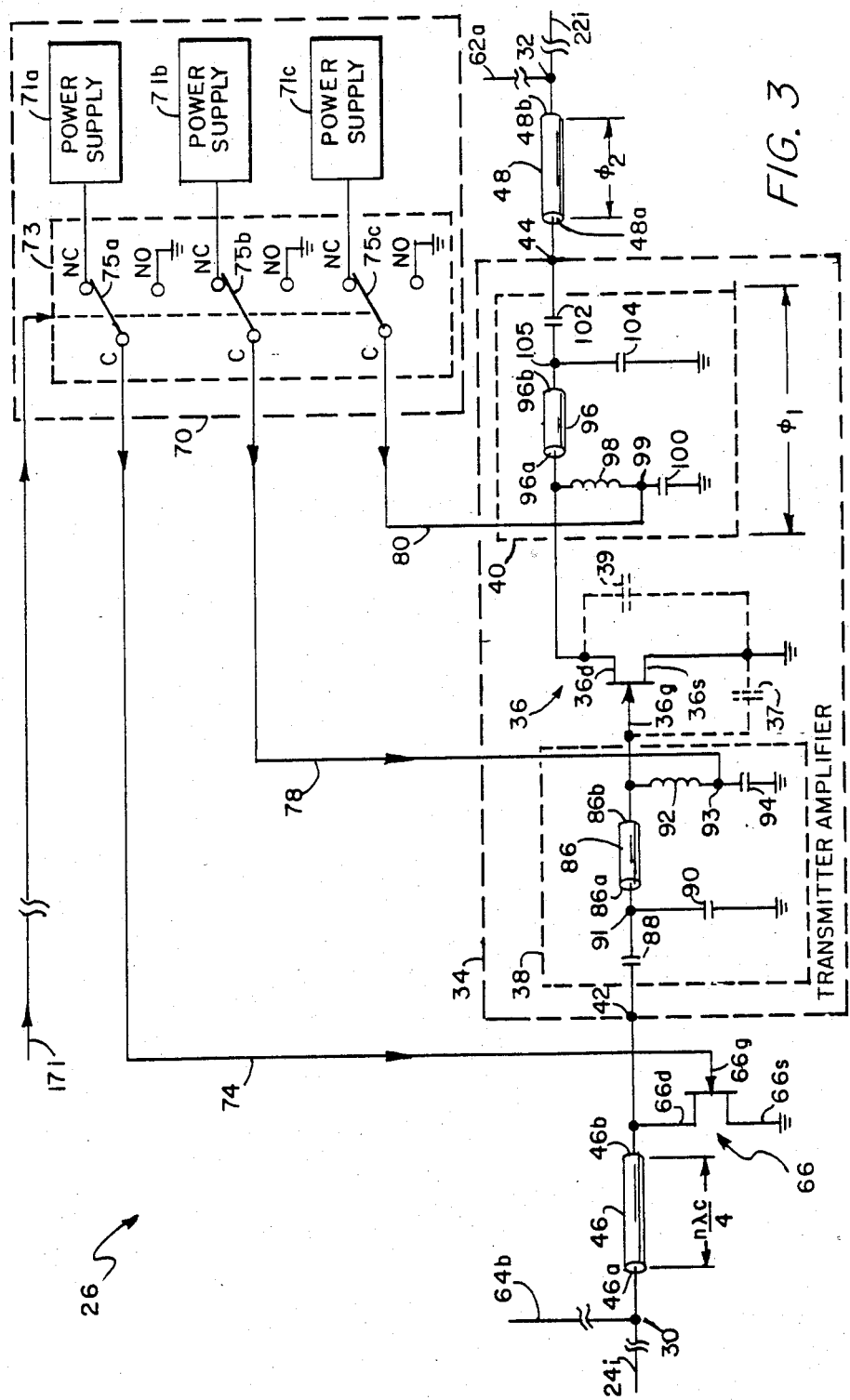
FIG. 3 is a schematic diagram of the transmitter circuit of the transceiver of FIG. 2 illustrating the T/R switch of the present invention.

Referring now to FIG. 3, a detailed schematic diagram of transmitter channel 26 in representative transceiver 16i is shown. As discussed, transmission line 46 is connected at first end 46a to phase shifter port 30, and at second end 46b to input port 42 of transmitter amplifier 34. Input port 42 is coupled to gate electrode 36g of power FET 36 by conventional input matching circuit 38, as shown. Input matching circuit 38 comprises a length of microwave transmission line 86 having a first end 86a coupled to input port 42 through DC blocking capacitor 88, and a second end 86b connected to gate electrode 36g and to a first end of tuning inductor 92. The second end of tuning inductor 92 is coupled to ground through capacitor 94. Tuning capacitor 90 is coupled from the junction 91 of DC blocking capacitor 88 and transmission line 86 to ground. As discussed, source electrode 36s of power FET 36 is also connected to ground. Drain electrode 36d is coupled to transmitter amplifier output port 44 via conventional output matching circuit 40, which is of a similar design to that of input matching circuit 38. A length of microwave transmission line 96 is connected at first end 96a to drain electrode 36d and tuning inductor 98, which is connected in series with capacitor 100 to ground. Second end 96b of microwave transmission line 96 is connected to DC blocking capacitor 102 and to a first end of tuning capacitor 104 at junction 105. The second end of tuning capacitor 104 is connected to ground. DC blocking capacitor 102 is connected serially with transmission line 96 to transmitter amplifier output port 44. Transmission line 48 couples transmitter amplifier output port 44 to antenna port 32, as shown.

Bias power for power FET 36 is provided by bias control unit 70 which comprises three DC power supplies 71a, 71b, 71c, each having an output coupled to switching unit 73. Switching unit 73 is a conventional DC switching arrangement, such as a transistor switching circuit, and is represented here by a set of single-pole, double-throw (SPDT) switches 75a, 75b, 75c. The "normally closed" (NC) terminal of each SPDT switch 75a, 75b, 75c is coupled to the output of a corresponding DC power supply 71a, 71b, 71c. The "normally open" (NO) terminal of each SPDT switch is connected to ground. The position of each SPDT switch is controlled by a transmit control signal fed to switching unit 73 on line 17i in a manner to be described hereinafter. The common (C) terminal of SPDT switch 75b is coupled by line 78 to junction 93 between tuning inductor 92 and capacitor 94 in input matching circuit 38. Line 80 couples the common (C) terminal of SPDT switch 75c to junction 99 between tuning inductor 98 and capacitor 100 in output matching circuit 40. Thus, when the transmit control signal on line 17i maintains the SPDT switches in switching unit 73 in the normally closed position, bias power from DC power supply 71b is coupled to power FET 36 via line 78 and input matching circuit 38. Tuning inductor 92 behaves as a DC short circuit, coupling the DC bias to gate electrode 36g; additionally, DC blocking capacitor 88 prevents the DC bias from coupling out of transmitter amplifier 34 and into microwave transmission line 46. Likewise, with SPDT switch 75c in the normally closed position, DC power supply 71c is coupled to drain electrode 36d via line 80 and output matching circuit 40. Tuning inductor 98, a DC short circuit, couples the DC bias to drain electrode 36d while DC blocking capacitor 102 isolates microwave transmission line 48 from the DC bias power. When the transmit control signal on line 17i changes SPDT switches 75a, 75b, 75c to the normally open position, power supplies 71b, 71c are decoupled from gate and drain electrodes 36g, 36d, respectively, said electrodes being coupled to ground potential (zero volts DC) through SPDT switches 75b, 75c, respectively.

The common (C) terminal of SPDT switch 75a is connected by line 74 to gate electrode 66g of switching FET 66. When the transmit control signal on line 17i maintains SPDT switch 75a in the normally closed position, power supply 71a is coupled via line 74 to gate electrode 66g, biasing switching FET 66 to a nonconducting state in a manner to be described. With SPDT switch 75a in the normally open position, as commanded by the transmit control signal on line 17i, gate electrode 66g is coupled to ground potential (zero volts DC) through SPDT switch 75a, placing switching FET 66 in a conducting state, as will be discussed.

Referring once again to FIG. 2, representative transceiver module 16i has, as stated, two modes of operation—a transmit mode using transmitter channel 26, and a receive mode using receiver channel 28. Since transmitter channel 26 and receiver channel 28 share a single pair of input/output ports (i.e., phase shifter port 30 and antenna port 32), it is manifest that transmit/receive (T/R) switching must be employed. That is, the channel not being used during a particular mode of transceiver operation must be electrically decoupled from the phase shifter and antenna ports 30, 32 to prevent the microwave signal from leaking into the unused channel, thereby impairing power efficiency and causing unwanted microwave reflections in the channel in use. In the present invention, the channel 26, 28 not in use during a particular mode of transceiver operation is electrically decoupled from phase shifter and antenna ports 30, 32 on command from radar system 12, which generates, for each transceiver 16a–16n, a pair of complementary transmit and receive control signals. The transmit control signals are coupled on lines 17a–17n, and the receive control signals coupled on lines $\overline{17a}$–$\overline{17n}$, to corresponding transceivers 16a–16n. The transmit control signals on lines 17a–17n are associated with the transmitter channels in transceivers 16a–16n, while the receive control signals on lines $\overline{17a}$–$\overline{17n}$ are associated with the receiver channels in transceivers 16a–16n. For example, in transceiver 16i, line 17i is associated with transmitter channel 26, and line $\overline{17i}$ is associated with receiver channel 28. In the preferred embodiment the transmit and receive control signals are logic signals, that is, signals having only two states—a logic 1 state and a logic 0 state. Since each pair of control signals are complementary, it follows that when the transmit control signals on lines 17a–17n are in the logic 1 state, the receive control signals on lines $\overline{17a}$–$\overline{17n}$ are in the logic 0 state, and vice versa. The logic state of the pairs of control signals corresponds to the mode of operation of radar system 12, and thus the mode of operation of transceivers 16a–16n. A logic 0 is sent on those lines associated with a channel in use during a particular mode of operation, with a logic 1 being produced on those lines associated with the unused channel. Thus, in the transmit mode, the transmit control signals on lines 17a–17n are set by radar system 12 to the logic 0 state, and the receive control signals on lines $\overline{17a}$–$\overline{17n}$ set to the logic 1 state. During the receive mode the converse is true, that is, the transmit control signals on lines 17a–17n are each made a logic 1, and the receive control signals on lines $\overline{17a}$–$\overline{17n}$ are made a logic 0. In each transceiver 16a–16n the microwave channel not in use during a particular mode (transmit or receive) of transceiver operation, and fed as described by a logic 1 control signal, is electrically decoupled from phase shifter and antenna ports 30, 32 in a manner to be described, while the microwave channel in use during that mode of transceiver operation, fed by a logic 0 control signal, couples the microwave signal applied thereto through the transceiver free from any loading effects of the unused microwave channel.

The detailed amplifying and switching operation of each microwave channel can be best understood by referring to FIG. 3 which, as discussed, is a schematic diagram of transmitter channel 26 of representative transceiver 16i. During the transmit mode, the transmit control signal fed on line 17i to switching unit 73 is a logic 0, as discussed. In response thereto, switching unit 73 maintains SPDT switches 75a, 75b, 75c in the normally closed position, coupling the outputs of DC power supplies 71a, 71b, 71c out of bias control unit 70 on lines 74, 78 and 80, respectively. Thus, the output of power supply 71a is fed to gate electrode 66g of switching FET 66. In the preferred embodiment, switching FET 66 is an n-channel, depletion mode metal semiconductor field effect transistor (MESFET). Power supply 71a provides a negative voltage of sufficient magnitude to pinch-off the conductive channel between drain electrode 66d and source electrode 66s. A typical value for the pinch-off voltage of an n-channel MESFET is −5 V. As is well known, pinch-off places FET 66 in a nonconducting condition and thereby creates a high impedance condition between drain electrode 66d and source elecrode 66s—and therefore between second end 46b of transmission line 46 and ground. During the transmission, a microwave signal enters transmitter channel 26 on transmission line 24i from reciprocal phase shifter 20i. For reasons to be explained, substantially none of the microwave signal enters receiver channel 28 at second end 64b of transmission line 64. Substantially the entire microwave signal propagates through transmission line 46 to second end 46b at transmitter amplifier input port 42. As discussed, pinched-off switching FET 66 presents a high impedance to ground at second end 46b, and thus has little, if any, loading effect on the microwave signal present on transmission line 46, allowing substantially the entire microwave signal to enter transmitter amplifier 34 at input port 42.

The microwave signal is coupled from input port 42 to power FET gate electrode 36g through conventional input matching circuit 38. Input matching circuit 38 comprises circuit elements selected to provide, at the nominal microwave signal frequency $f_c$, impedance transformation from the characteristic impedance of transmission line 46 to approximately match the input impedance of power FET 36. To put it another way, such circuit elements are selected to provide a 50 ohm matched impedance for 50 ohm transmission line 46, and transformation of that impedance to an impedance seen by gate electrode 36g approximately matched to the input impedance of power FET 36. Much of this effect is accomplished by the cooperation of transmission line 86, tuning capacitor 90, tuning inductor 92, and, to a lesser extent, DC blocking capacitor 88. Capacitor 94 prevents the microwave signal from appearing on line 78, and hence is selected to be large enough to be an effective short circuit to microwave signals, but its value must be taken into account when selecting the other matching circuit components. Power FET 36 has associated therewith an inherent parasitic reactance 37, shown in phantom to emphasize that such reactance is an inherent characteristic of FET 36 and is not a discrete circuit element. Nevertheless, the effects of such parasitic reactance must be minimized at nominal microwave frequency $f_c$. Thus, the inductance of tuning inductor 92 is selected to tune out the effects of parasitic reactance 37 at nominal microwave frequency $f_c$.

In the preferred embodiment, power FET 36 is an n-channel, depletion mode MESFET, typically providing 8 dB of gain and an output power of between 5 and 10 watts. As discussed, during the transmit mode the outputs of power supplies 71b, 71c are coupled to gate and drain electrodes 36g, 36d, respectively. The power supply voltages 71b, 71c are selected to bias power FET 36 in the middle of its active (or nominal operating) region. Typically, power supply 71b will bias gate 36g to about −2.5 volts DC and power supply 71c will bias drain 36d to about +10 volts DC in order to achieve 10 watts of microwave output power. As shown, source electrode 36s is connected directly to ground (zero volts DC). Power FET 36 is thus biased to respond to the microwave signal applied to gate electrode 36g to produce an amplified microwave signal at drain electrode 36d. To provide maximum output power and efficiency, drain electrode 36d is loaded with an appropriate matched impedance (i.e., a loadline) at nominal operating frequency $f_c$. Thus, conventional output matching circuit 40 comprises components selected to provide, at the nominal frequency $f_c$ of the amplified microwave signal, a load for drain electrode 36d that approximates such loadline. Output matching circuit 40 also provides transformation of such load to an impedance as seen at output port 44 matched to the characteristic impedance of microwave transmission line 48 (typically 50 ohms). Much of the impedance matching and transformation is achieved by the cooperation of transmission line 96, tuning inductor 98, tuning capacitor 104, and, to a small extent, DC blocking capacitor 102. Capacitor 100 prevents the microwave signal from coupling onto line 80, and as such has a value large enough to be an effective short circuit at microwave frequencies, but its value must be taken into account when selecting the other matching circuit elements. Power FET 36 has associated therewith an inherent parasitic reactance, shown in FIG. 3 as capacitor 39 in phantom to emphasize that such reactance is an inherent characteristic of FET 36 and is not a discrete circuit element. Nevertheless, the effects of such parasitic reactance must be minimized at nominal microwave frequency $f_c$. Thus, the inductance of tuning inductor 98 is selected to tune out the effects of parasitic reactance 39 at nominal microwave frequency $f_c$.

The amplified microwave signal coupled to transmitter amplifier output port 44 is further coupled by transmission line 48 to antenna port 32. For reasons to be discussed hereinafter, such microwave signal does not enter receiver channel 28 at first end 62a of 50 ohm transmission line 62; rather, substantially all of the microwave signal is coupled on 50 ohm transmission line 22i to antenna element 18i (FIG. 1) and is transmitted to a target.

At a predetermined time after transmission, radar system 12 switches from the transmit mode to the receive mode in order to allow the radar to process received portions of the transmitted microwave signal reflected by a target. Referring to FIG. 2, the portion of the reflected microwave signal received by antenna element 18i and coupled along 50 ohm transmission line 22i appears at antenna port 32. For proper receive operation, substantially all of the microwave signal is directed into receiver channel 28 via transmission line 62 by the T/R switching arrangement of the present invention, which prevents the received microwave signal from entering transmitter channel 26 through transmission line 48.

As discussed, during the receive mode each transmit control signal on lines 17a–17n is switched to a logic 1 by radar system 12, and each receive control signal on lines $\overline{17a}$–$\overline{17n}$ is switched by radar system 12 to a logic 0. Thus, in representative transceiver 16i, the receive control signal on line $\overline{17i}$ associated with receiver channel 28 is made a logic 0, and the transmit control signal on line 17i associated with transmitter channel 26 is made a logic 1. Referring now to FIG. 3, the logic 1 on line 17i activates switching unit 73 of bias control unit 70, switching SPDT switches 75a, 75b, 75c from the normally closed position (NC) to the normally open (NO) position. This places ground potential (zero volts DC) on lines 74, 78 and 80. Grounded lines 78, 80 in turn ground gate electrode 36g and drain electrode 36d of power FET 36 through tuning inductors 92, 98, respectively, thus decoupling power from FET 36. The depletion mode power FET 36 is thus switched to a bias state wherein its gate-to-source voltage and drain-to-source voltage are zero volts. As a result, the conducting channel between the drain and source electrodes 36d, 36s is allowed to freely conduct current across its entire width. This creates a low impedance between drain electrode 36d and source electrode 36s, and effectively creates a microwave and DC short circuit to ground at drain electrode 36d. The total length of the microwave signal path between drain electrode 36d and antenna port 32 is an odd multiple (i.e., n=1, 3, 5, etc.) of a quarter-wavelength ($n\lambda_c/4$) of the nominal wavelength ($\lambda_c$). Such quarter-wavelength microwave signal path transforms the grounded short circuit at drain electrode 36d to a high impedance—effectively an open circuit—at antenna port 32. To the received microwave signal entering transceiver 16i on 50-ohm transmission line 22i (FIG. 1), transmitter channel 26 is seen as an open circuit compared to the characteristic impedance of transmission line 62, which is typically 50 ohms. Thus, during the receive mode transmitter channel 26 is electrically decoupled, at second end 48b of transmission line 48, from antenna port 32, allowing substantially the entire received microwave signal to be coupled from 50 ohm transmission line 22i into receiver channel 28 via transmission line 62, and preventing the microwave signal from entering transmitter channel 26.

The microwave signal path between drain electrode 36d and antenna port 32 comprises output matching circuit 40 and transmission line 48. At the nominal microwave signal frequency $f_c$, output matching circuit 40 introduces a predetermined phase shift $\phi_1$ in the microwave signal. The length of transmission line 48 produces an additional phase shift $\phi_2$ in the microwave signal to satisfy the relationship $\phi_1+\phi_2=n\lambda_c/4$, where $n\lambda_c/4$ is an odd multiple of the nominal quarter-wavelength of the microwave signal. As is well known in the art, a short circuit to ground at one end (i.e., drain electrode 36d) of an odd multiple of a quarter-wavelength circuit path is transformed to an open circuit at the second end (i.e., antenna port 32) of the quarter-wavelength circuit path.

Thus, T/R switching of transmitter channel 26 at antenna port 32 is performed in the present invention by removing bias power from power FET 36 to create a short circuit to ground at drain electrode 36d, the $n\lambda_c/4$ total phase shift between drain electrode 36d and antenna port 32 transforming the short circuit to a high impedance at antenna port 32. Received energy at antenna port 32 from antenna 18i is thus inhibited from entering transmitter channel 26. Thus, transmitter channel 26 is electrically decoupled from antenna port 32 at second end 48b of transmission line 48. Such decoupling allows substantially the entire target-reflected microwave signal received by antenna element 18i to be coupled from 50 ohm transmission line 22i into transmission line 62 of receiver channel 28. Thus it is seen that the T/R switching arrangement of the present invention incorporates therein the final stage 36 of transmitter amplifier 34, such final stage being switched between two modes of operation—an amplifying mode during transmission, and a switched mode during reception. It is noted that during transmission FET 36 is not maintained in pinch-off, thus the gate-to-drain breakdown voltage of FET 36 is not approached during positive instantaneous voltage swings of the amplified, transmitted microwave signal, allowing greater microwave power to be transmitted by the transceiver.

Considering next receiver channel 28 (FIG. 2), it is first noted that such channel is of substantially identical configuration to transmitter channel 26 shown in FIG. 3. During reception, the received microwave signal is fed from antenna element 18i to antenna port 32 by transmission line 22i. As discussed, the T/R switching arrangement in transmitter circuit 26 inhibits such microwave signal from entering transmission line 48. Thus, substantially the entire received microwave signal at antenna port 32 couples into first end 62a of transmission line 62 and propagates through said transmission line to receiver amplifier input port 58. As discussed, the receive control signal on 17i is set to a logic 0 during the receive mode. Thus, bias control unit 72, which is substantially identical to bias control unit 70, couples onto line 76 a DC voltage sufficient to keep switching FET 68 pinched-off during the receive mode. Pinched-off switching FET 68 is thus nonconducting and produces a high impedance between drain electrode 68d and source electrode 68s, preventing the microwave signal from flowing to ground through switching FET 68. Substantially the entire microwave signal, then, is coupled from second end 62b of transmission line 62 into receiver amplifier 50. Input matching circuit 54 transforms the characteristic impedance (about 50 ohms) of transmission line 62 to an appropriate impedance with which to load gate electrode 52g. Such impedance is selected to provide the optimum noise figure for the amplifier, and thus may not be matched to the input impedance of FET 52. Thus, there may be an impedance mismatch at gate electrode 52g; however, any reduction in FET gain and efficiently caused thereby is offset by the optimization of the amplifier's performance in the presence of noise.

FET 52 is an n-channel, depletion mode device in the preferred embodiment and is designed for small signal operation, with the emphasis on optimum noise figure and gain rather than on maximum output power. During the receive mode, bias control unit 72 couples DC bias power on lines 82, 84 to gate and drain electrodes 52g, 52d, respectively, via input matching circuit 54 and output matching circuit 56, respectively. The biasing voltages are selected to bias FET 52 in the middle of its active (or nominal operating) region. As with power FET 36, source electrode 52s of FET 52 is connected directly to ground. The low-noise FET 52 thus biased amplifies the microwave signal applied to gate electrode 52g thereof and produces such amplified microwave signal at drain electrode 52d, where it is coupled to receiver amplifier output port 60 via output matching circuit 56. Output matching circuit 56 provides low-noise amplifier FET 52 with a load impedance matched to the output impedance of FET 52, which is typically about 100 to 400 ohms. Such a matched load impedance maximizes the gain provided by low-noise FET 52. Output matching circuit 56 also provides shunt inductance to tune out the inherent parasitic reactance of low-noise amplifier FET 52, similar to the tuning effect inductor 98 has on parasitic reactance 39 in transmitter amplifier 34. Output matching circuit 56 further transforms the output impedance of FET 52 to the characteristic impedance of transmission line 64 (typically about 50 ohms) at receiver amplifier output port 60. Thus, transmission line 64 is fed by an impedance-matched microwave signal source to maximize signal coupling efficiency and minimize unwanted microwave reflections at first end 64a of transmission line 64. The microwave signal is coupled by transmission line 64 to phase shifter port 30, from which the signal is coupled to phase shifter 20i by 50 ohm transmission line 24i.

The microwave signal at phase shifter port 30 is prevented from entering transmitter channel 26 via transmission line 46 in the following manner. As discussed, during the receive mode a logic 1 on control line 17*i* causes bias control unit 70 to place ground potential (zero volts DC) on line 74. Referring now to FIG. 3, gate electrode 66*g* is thus no longer biased to the pinch-off voltage by power supply 71*a*, but instead is biased at zero volts. Hence, the conducting channel between drain electrode 66*d* and source electrode 66*s* is allowed to fully conduct current across its entire width, creating a low impedance between drain and source electrodes 66*d*, 66*s*. This effectively creates a short circuit to ground at second end 46*b* of transmission line 46. As noted in FIG. 3, the length of transmission line 46 corresponds to an odd multiple of the nominal quarter-wavelength ($n\lambda_c/4$) of the microwave signal. Such quarter-wavelength transmission line 46 transforms the short circuit to ground at second end 46*b* to effectively an open circuit at first end 46*a*, and hence at phase shifter port 30. Referring again to FIG. 2, the microwave signal applied to phase shifter port 30 by receiver channel 26 sees transmitter channel 26 as an open circuit. Thus, substantially the entire microwave signal from receiver channel 28 is coupled out of transceiver 16*i* on 50 ohm transmission line 24*i*. Transmitter channel 26 is therefore electrically decoupled at second end 46*b* of transmission line 46 from phase shifter port 30 during the receive mode.

As described above, transmitter channel 26 and receiver channel 28 are of substantially similar construction. Thus, during the transmit mode receiver channel 28 is electrically decoupled from phase shifter port 30 and antenna port 32 in a manner similar to that just described for transmitter channel 26 during the receive mode. Referring to FIG. 2 and FIG. 3, during the transmit mode bias control unit 72 places ground potential (zero volts DC) on lines 76, 82 and 84 in response to a logic 1 on line $\overline{17i}$. The removal of power from gate and drain electrodes 52*g*, 52*d* of low-noise amplifier FET 52 allows the conducting channel between drain electrode 52*d* and source electrode 52*s* to conduct current across its entire width, producing a low impedance condition between drain electrode 52*d* and ground. The length of transmission line 64 provides a phase shift at the nominal microwave frequency $f_c$ to produce, along with the inherent phase shift of output matching circuit 56, a total phase shift of an odd multiple of a quarter-wavelength ($n\lambda_c/4$, where $n = 1, 3, 5$, etc.) between drain electrode 52*d* and phase shifter port 30. The short circuit to ground at drain electrode 52*d* is thus transformed to a high impedance at phase shifter port 30.

Thus, T/R switching of receiver channel 28 at phase shifter port 30 is performed in the present invention by removing bias power from FET 52 to create a short circuit to ground at drain electrode 52*d*, the $n\lambda_c/4$ total phase shift between drain electrode 52*d* and phase shifter port 30 transforming the short circuit to a high impedance at phase shifter port 30. The microwave signal at phase shifter port 30 from radar system 12 is thus inhibited from entering receiver channel 28 during transmission. Thus, receiver channel 28 is electrically decoupled from phase shifter port 30 at second end 64*b* of transmission line 64. Such decoupling allows substantially the entire microwave signal to be transmitted to be coupled from 50 ohm transmission line 24*i* into transmission line 46 of transmitter channel 26. It is therefore seen that the T/R switching arrangement of the present invention incorporates therein the final stage 52 of receiver amplifier 50, such final stage being switched between two modes of operation— an amplifying mode during reception, and a switched mode during transmission. It is noted that during reception FET 50 is not maintained in pinch-off, thus the gate-to-drain breakdown voltage of FET 50 is not approached during positive instantaneous voltage swings of the amplified, received microwave signal.

The ground potential on line 76 applied to gate electrode 68*g* of switching FET 68 removes such FET from its pinched-off state and allows current to flow substantially unimpeded from drain electrode 68*d* to source electrode 68*s*, creating a short circuit to ground at second end 62*b* of transmission line 62. The length of transmission line 62 is an odd multiple of a quarter-wavelength of the nominal wavelength. Transmission line 62 thus transforms the short circuit to ground at second end 62*b* to a high impedance at antenna port 32. Receiver channel 28, appearing as an open circuit at both phase shifter port 30 and antenna port 32, is electrically decoupled from antenna and phase shifter ports 30, 32 during the transmit mode of operation.

Figure 4:
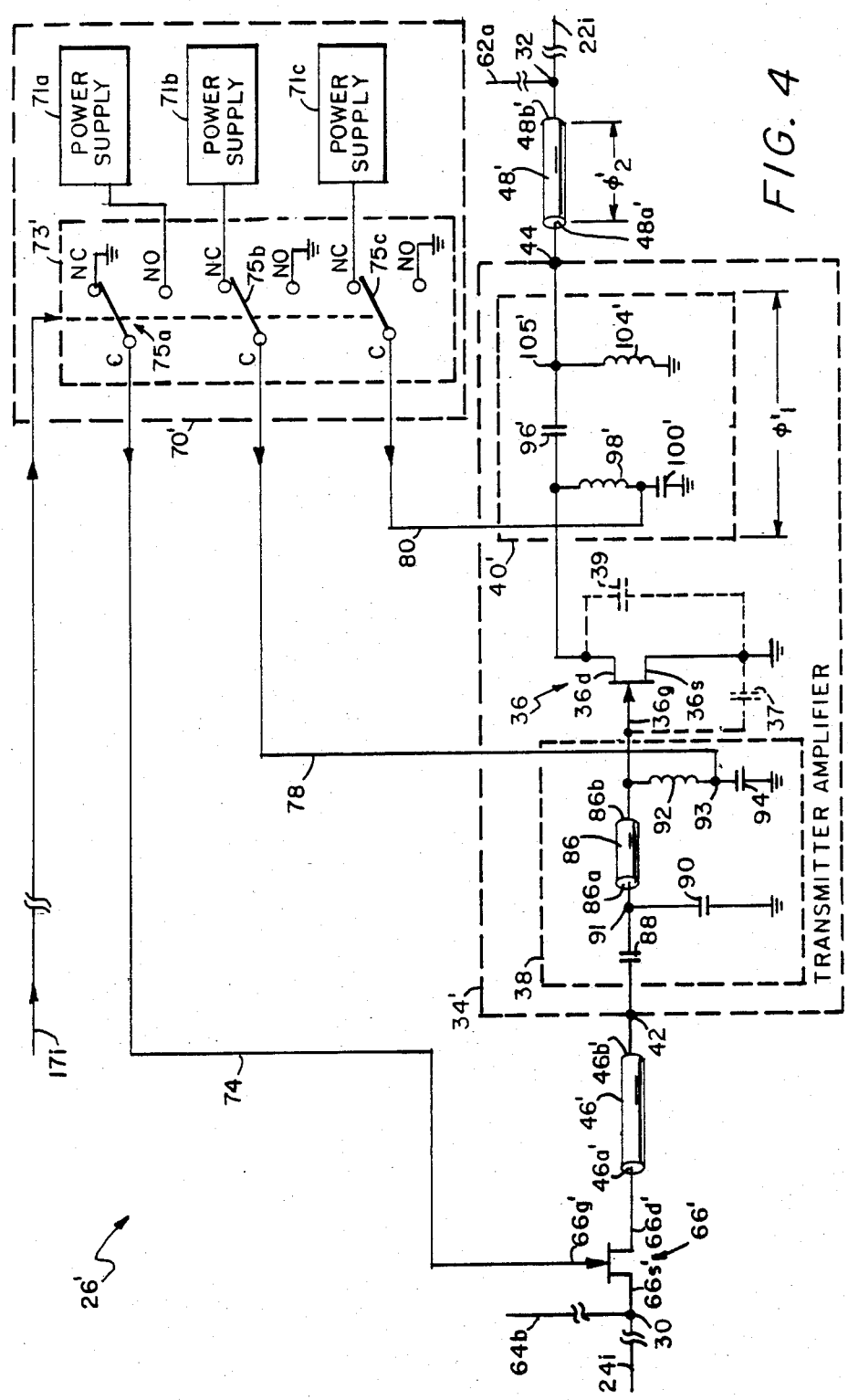
FIG. 4 is an alternate embodiment of the transmitter circuit of FIG. 3.

An alternate embodiment of the T/R switch arrangement of the present invention is shown in FIG. 4 as a modification to transmitter channel 26, although such modification applies as well to receiver channel 28. Modified transmitter channel 26' is coupled between phase shifter port 30 and antenna port 32 and is configured similarly to transmitter channel 26 of FIG. 3. Transmitter channel 26' comprises transmitter amplifier 34', switching FET 66', and transmission lines 46', 48', coupled between phase shifter port 30 and antenna port 32, as shown. Bias control unit 70', fed by a logic control signal on line 17*i*, provides switchable DC bias power on lines 78, 80 for transmitter amplifier 34', and a switching signal on line 74 for switching FET 66', as shown.

Switching FET 66' is here connected serially with phase shifter port 30 and transmission line 46' by connecting source electrode 66*s*' to phase shifter port 30 and drain electrode 66*d*' to first end 46*a*' of transmission line 46'. Second end 46*b*' is coupled to transmitter amplifier input port 42. Transmission line 46' has a predetermined characteristic impedance of, here, 50 ohms. Input port 42 is connected by input matching circuit 38 to gate electrode 36*g* of power FET 36. As previously discussed, gain and power requirements may dictate the use of a multistage amplifier, in which case FET 36 represents the final stage of such amplifier. Input matching circuit 38 is of the same configuration as was previously discussed in relation to FIG. 3. Power FET 36 is connected as a common-source device, with source electrode 36*s* being grounded. Drain electrode 36*d* is coupled to transmitter amplifier output port 44 by modified output matchinq circuit 40'. Transmission line 48', having a characteristic impedance of, here, 50 ohms, is connected at first end 48*a*' to transmitter amplifier output port 44, and at second end 48*b*' to common antenna port 32.

During the transmit mode, radar system 12 (FIG. 1) places a logic 0 on line 17*i*, as previously discussed, maintaining switches 75*a*, 75*b* and 75*c* in the normally closed (NC) position. Thus, ground potential is present on line 74 and is coupled to gate electrode 66*g*' of series switching FET 66'. FET 66' is here an n-channel, depletion mode device; thus, zero volts applied to gate electrode 66*g*' allows the conductive channel between source and drain electrodes 66*s*', 66*d*' to fully conduct current. The microwave signal to be transmitted is thus coupled from transmission line 24*i* to transmission line 46' with substantially no loss introduced by FET 66'. Such microwave signal is further coupled through transmission line 46' and input matching circuit 38 and is applied to gate electrode 36g of power FET 36. With switches 75b and 75c in the NC position, bias power from power supplies 71b and 71c is applied on lines 78, 80 to gate and drain electrodes 36g, 36d via matching circuits 38, 40', respectively. FET 36 is thereby biased in the middle of its active (or nominal operating) region and produces at drain electrode 36d the microwave signal applied to gate electrode 36g, amplified by a predetermined amount. The amplified microwave signal is coupled by modified output matching circuit 40' and transmission line 48' to common antenna port 32, from which the signal is applied to antenna element 18i (FIG. 1) by transmission line 22i.

Output matching circuit 40' comprises tuning capacitor 96', coupled at a first end to drain electrode 36d and tuning inductor 98'. Tuning inductor 98' is connected serially with blocking capacitor 100' to ground, the junction of the two components being fed by line 80 from bias control unit 70'. The second end of tuning capacitor 96' is coupled to transmitter amplifier output port 44 and to ground through tuning inductor 104'. Thus configured, output matching circuit 40' is a conventional "lead network". That is, microwave signals coupled therethrough from FET 36 and appearing at transmitter amplifier output port 44 are phase advanced compared with signals at drain electrode 36d by a predetermined amount, $\phi_1'$. This is to be compared with the "lag network", shown in FIG. 3, where output matching circuit 40 delays the phase of microwave signals passing therethrough by an amount, $\phi_1$. The values of tuning inductors 98', 104', tuning capacitor 96', and, to a lesser extent, blocking capacitor 100', are selected so that output matching circuit 40' presents a load to FET 36 at nominal frequency $f_c$ which maximizes the output power and efficiency obtained from FET 36. Output matching circuit 40 also transforms such load to the characteristic impedance of transmission line 48', typically 50 ohms. In addition, the value of tuning inductor 98' is selected to tune out the parasitic reactance 39 of FET 36 at nominal frequency $f_c$.

During reception, transmitter channel 26' is electrically decoupled from phase shifter and antenna ports 30, 32 in the following manner. Radar system 12 places a logic 1 on line 17i, causing switches 75a, 75b, 75c to switch to the normally open (NO) position. Bias power is thus removed from FET 36, an n-channel, depletion mode device, allowing the conductive channel between drain and source electrodes 36d, 36s to fully conduct current. As discussed, this produces a microwave and DC short circuit to ground at drain electrode 36d. The phase advance $\phi_1'$ of output matching circuit 40' and the phase delay $\phi_2'$ of transmission line 48' produce a total phase difference of an odd multiple of a quarter-wavelength ($n\lambda_c/4$, $n=1, 3, 5$, etc.) between drain electrode 36d and antenna port 32. Such phase difference may be a phase advance of $n\lambda_c/4$, in which case $\phi_1'$ is chosen to yield slightly more than a $n\lambda_c/4$ phase advance, with the phase delay $\phi_2'$ introducing a phase lag just sufficient to produce a total phase advance of $n\lambda_c/4$. As previously discussed, the $n\lambda_c/4$ phase difference transforms the short circuit at drain electrode 36d to an effective open circuit compared to the characteristic impedance of receiver channel 28, thereby electrically decoupling transmitter channel 26' from antenna port 32 at second end 48b' of transmission line 48'. Thus substantially the entire signal received by antenna element 18i is coupled at antenna port 32 into receiver channel 28 by transmission line 62.

Transmitter channel is electrically decoupled from phase shifter port 30 by series switching FET 66'. With switch 75a in the NO position during the receive mode, a DC voltage from power supply 71a is fed to gate electrode 66g'. The voltage is selected to be sufficient in magnitude and polarity (negative for an n-channel FET) to pinch-off the conductive channel between source and drain electrodes 66s', 66d'. This creates a high-impedance condition between electrodes 66s', 66d' compared with the characteristic impedance (typically 50 ohms) of transmission line 24i such high impedance electrically decoupling transmitter channel 26' from phase shifter port 30 at first end 46a' of transmission line 46'. Thus, the microwave signal coupled to phase shifter port 30 from transmission line 64 of receiver channel 28 is substantially entirely coupled through transmission line 24i to phase shifter 20i (FIG. 1). It is noted that since series switching is employed, the length of transmission line 46' need not be chosen to produce a quarter-wavelength ($n\lambda_c/4$) phase shift.

Although preferred embodiments of the present invention have been described, several alternate embodiments may be apparent to those skilled in the art. For example, while a single-stage FET has been shown for transmitter amplifier 34 and for receiver amplifier 36, multi-stage FETs may be used, so long as the bias to the final stage is switchable as described. In addition, while FETs 36, 52 have been described as n-channel, depletion-mode devices, p-channel FETs may alternately be used. Also, FETs 36, 52 need not be depletion-mode transistors; enhancement mode devices, p- or n-channel, may be utilized. In such case, each of such FETs is switched to the low impedance mode by switching the bias on the drain electrode to zero volts and switching the gate bias to a voltage of sufficient magnitude and proper polarity to provide a maximally enhanced conductive channel between the drain and source electrodes. Further, although a radar system having transmission lines with a 50-ohm characteristic impedance has been described, other impedances, such as 75 ohms, may be utilized. Additionally, while specific embodiments of conventional input and output matching circuits have been described, other embodiments may be used. Finally, it is noted that the microwave circuitry in the transceiver described may be formed on a semi-insulating substrate, such as gallium arsenide (GaAs), with a common ground plane. Accordingly, it is understood that the present invention is to be limited only by the scope of the appended claims.

What is claimed is:

1. In combination:
    means for amplifying an applied signal and operating with a relatively high output impedance when power is applied thereto, such means being inhibited from amplifying the applied signal when power is removed therefrom;
    means, responsive to a control signal, for switchably applying power to the amplifying means during a first operating mode and removing power from the amplifying means during a second operating mode to switch the relatively high output impedance of such amplifying means to a relatively low output impedance; and
    means for coupling the amplified signal to an output port during the first operating mode, and for transforming the relatively low output impedance to a relatively high impedance at the output port during the second operating mode.

2. The combination of claim 1 wherein the amplifying means includes an output transistor comprising: an input electrode fed by the applied signal; an output electrode coupled to the coupling and transforming means; and, a common electrode coupled to a reference potential, wherein an impedance is present between the output electrode and the common eIeotrode, such impedance being the output impedance of the amplifying means.

3. The combination of claim 2 wherein the output transistor comprises a field effect transistor having a gate electrode, a drain electrode and a source electrode, wherein the gate electrode is the input electrode, the drain electrode is the output electrode and the source electrode is the common electrode.

4. The combination of claim 3 wherein the reference potential is ground potential.

5. The combination of claim 2 wherein the coupling and transforming means comprises: a network; and, a transmission line coupled to the network, wherein the output electrode is coupled to the switchable power applying and removing means through the network.

6. The combination of claim 2 wherein the applied signal has a predetermined wavelength and the coupling and transforming means is selected to provide a predetermined phase shift between the output electrode and the output port, said predetermined phase shift being substantially an odd multiple of a quarter of the predetermined wavelength.

7. The combination of claim 6 wherein the coupling and transforming means comprises:
a network coupled to the output electrode of the output transistor; and
a transmission line coupled between the network and the output port,
wherein the network, at the predetermined wavelength, provides a predetermined load for the output transistor, presents a predetermined impedance to the transmission line, and produces a first predetermined phase shift.

8. The combination of claim 7 wherein the transmission line has a predetermined electrical length selected to produce a second predetermined phase shift at the predetermined wavelength, the first and second predetermined phase shifts providing a total phase shift between the output electrode and the output port of substantially an odd multiple of a quarter of the predetermined wavelength.

9. In a transceiver wherein a signal is coupled from a first port to a second port through a first circuit having a characteristic impedance during a first operating mode, and a signal is coupled from the second port to the first port through a second circuit having a characteristic impedance during a second operating mode, the second circuit being substantially electrically decoupled from the first and second ports during the first operating mode and the first circuit being substantially electrically decoupled from the first and second ports during the second operating mode, the improvement comprising:
first and second amplifying means, correspondingly disposed in the first and second circuits, for amplifying signals applied thereto and operating with a relatively high output impedance when power is applied thereto, such first and second amplifying means being inhibited from amplifying signals applied thereto when power is removed therefrom;
means, responsive to a first control signal, for switchably applying power to the first amplifying means during the first operating mode and removing such power from the first amplifying means during the second operating mode to switch the relatively high output impedance of the first amplifying means to a relatively low output impedance;
means, responsive to a second control signal, for switchably applying power to the second amplifying means during the second operating mode and removing such power from the second amplifying means during the first operating mode to switch the relatively high output impedance of the second amplifying means to a relatively low output impedance;
first means for coupling the amplified signal from the first amplifying means to the second port during the first operating mode, and for transforming, during the second operating mode, the relatively low output impedance of the first amplifying means to an impedance at the second port substantially higher than the characteristic impedance of the second circuit; and
second means for coupling the amplified signal from the second amplifying means to the first port during the second operating mode, and for transforming, during the first operating mode the relatively low output impedance of the second amplifying means to an impedance at the first port substantially higher than the characteristic impedance of the first circuit.

10. The transceiver of claim 9 further comprising:
first switching means associated with the first circuit and responsive to the first control signal for electrically decoupling the first circuit from the first port during the second operating mode; and
second switching means associated with the second circuit and responsive to the second control signal for electrically decoupling the second circuit from the second port during the first operating mode.

11. The transceiver of claim 9 wherein:
the first amplifying means comprises a first output transistor comprising: an input electrode fed by the applied signal; an output electrode coupled to the first coupling and transforming means; and, a common electrode coupled to a reference potential, wherein an impedance is present between the output electrode and the common electrode, such impedance being the output impedance of the first amplifying means; and
the second amplifying means comprises a second output transistor comprising: an input electrode fed by the applied signal; an output electrode coupled to the second coupling and transforming means; and, a common electrode coupled to a reference potential, wherein an impedance is present between the output electrode and the common electrode, such impedance being the output impedance of the second amplifying means.

12. The transceiver of claim 11 wherein the signal has a predetermined wavelength, the first coupling and transforming means being selected to provide a first predetermined phase shift between the output electrode of the first output transistor and the second port, the first predetermined phase shift being substantially an odd multiple of a quarter of the predetermined wavelength, and the second coupling and transforming means being selected to provide a second predetermined phase shift between the output electrode of the second output transistor and the first port, the second predetermined phase shift being substantially an odd multiple of a quarter of the predetermined wavelength.

13. A microwave transceiver comprising:
  (a) a transmitter circuit comprising:
    a transmitter amplifier;
    a first transmission line, having a characteristic impedance, coupled between a first port and an input of the transmitter amplifier; and
    a second transmission line, having a characteristic impedance, coupled between an output of the transmitter amplifier and a second port;
    the transmitter circuit coupling an applied microwave signal therethrough from the first port to the second port during a transmission mode;
  (b) a receiver circuit comprising:
    a receiver amplifier;
    a third transmission line, having a characteristic impedance, coupled between the second port and an input of the receiver amplifier; and
    a fourth transmission line, having a characteristic impedance, coupled between an output of the receiver amplifier and the first port;
    the receiver circuit coupling an applied microwave signal therethrough from the second port to the first port during a reception mode;
  (c) means, responsive to control signals, for coupling power to the transmitter amplifier and decoupling power from the receiver amplifier during the transmission mode, and for decoupling power from the transmitter amplifier and coupling power to the receiver amplifier during the reception mode,
    wherein the one of the amplifiers having power coupled thereto amplifies a microwave signal applied to the input thereof, produces the amplified microwave signal at an output, and operates with a relatively high output impedance, and the one of the amplifiers having power decoupled therefrom is inhibited from amplifying a microwave signal applied to the input thereof and operates with a relatively low output impedance;
  (d) first means, including the second transmission line, for coupling the amplified microwave signal from the output of the transmitter amplifier to the second port during the transmission mode, and for transforming, during the reception mode, the relatively low output impedance of the transmitter amplifier to an impedance at the second port substantially higher than the characteristic impedance of the third transmission line; and
  (e) second means, including the fourth transmission line, for coupling the amplified microwave signal from the output of the receiver amplifier to the first port during the reception mode, and for transforming, during the transmission mode, the relatively low output impedance of the receiver amplifier to an impedance at the first port substantially higher than the characteristic impedance of the first transmission line.

14. The microwave transceiver of claim 13 wherein the microwave signal has a predetermined wavelength and the first and second coupling and transforming means are each selected to provide a predetermined phase shift between the output of the amplifier associated therewith and the port associated therewith, such predetermined phase shift being substantially an odd multiple of a quarter of the predetermined wavelength.

15. The microwave transceiver of claim 14 wherein the first coupling and transforming means further comprises:
  a first network coupled between the output of the transmitter amplifier and the second transmission line,
  wherein the first network, at the predetermined wavelength, provides a predetermined load for the transmitter amplifier, presents a predetermined impedance to the second transmission line, and produces a first phase shift.

16. The microwave transceiver of claim 15 wherein the second transmission line is selected to produce a second phase shift at the predetermined wavelength, the first and second phase shifts producing an aggregate phase shift of substantially an odd multiple of a quarter of the predetermined wavelength.

17. The microwave transceiver of claim 14 wherein the second coupling and transforming means further comprises:
  a second network coupled between the output of the receiver amplifier and the fourth transmission line;
  wherein the second network, at the predetermined wavelength, provides a predetermined load for the receiver amplifier, presents a predetermined impedance to the fourth transmission line, and produces a first phase shift.

18. The microwave transceiver of claim 17 wherein the fourth transmission line is selected to produce a second phase shift at the predetermined wavelength, the first and second phase shifts producing an aggregate phase shift of substantially an odd multiple of a quarter of the predetermined wavelength.

19. The microwave transceiver of claim 14 wherein the transmitter and receiver amplifiers each comprise an output transistor, each output transistor comprising: an input electrode fed by the applied microwave signal; a common electrode coupled to a reference potential; and, an output electrode, such output electrode being the output of the amplifier;
  wherein the output impedance of each of the transmitter and receiver amplifiers exists between the output electrode and the common electrode of each of the output transistors of the amplifiers.

20. The microwave transceiver of claim 19 wherein the reference potential is ground potential.

21. The microwave transceiver of claim 19 wherein the output transister comprises a field effect transistor.

22. The microwave transceiver of claim 19 wherein the first transforming and coupling means further comprises a first network disposed between the output electrode of the transmitter amplifier output transistor and the second transmission line, wherein such output electrode is coupled to the power coupling and decoupling means through the first network.

23. The microwave transceiver of claim 19 wherein the second transforming and coupling means further comprises a second network disposed between the output electrode of the receiver amplifier output transistor and the fourth transmission line, wherein such output electrode is coupled to the power coupling and decoupling means through the second network.

24. The microwave transceiver of claim 14 further comprising:
  first switching means, associated with the first transmission line and fed by a first switching signal from the power coupling and decoupling means, for switching between a first state, during the transmission mode, and a second state, during the reception mode;

wherein the transmitter circuit presents an impedance to the first port, said impedance being essentially equal to the characteristic impedance of the first transmission line when the first switching means is switched to the first state, and said impedance being substantially greater than such characteristic impedance when the first switching means is switched to the second state; and second switching means, associated with the third transmission line and fed by a second switching signal from the power coupling and decoupling means, for switching between a first state, during the reception mode, and a second state, during the transmission mode;

wherein the receiver circuit presents an impedance to the second port, said impedance being essentially equal to the characteristic impedance of the third transmission line when the second switching means is switched to the first state, and said impedance being substantially greater than such characteristic impedance when the second switching means is switched to the second state.

* * * * *